March 10, 1942. J. E. BRANDENBERGER 2,276,151
PHOTOGRAPHIC ELEMENT HAVING A LAMINATED FILM SUPPORT
Filed July 5, 1939
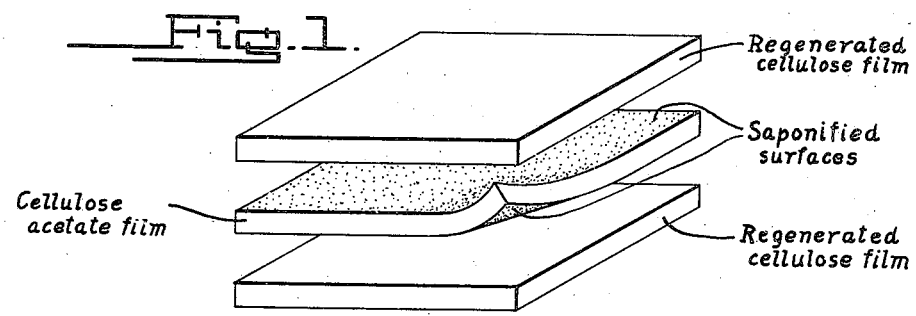
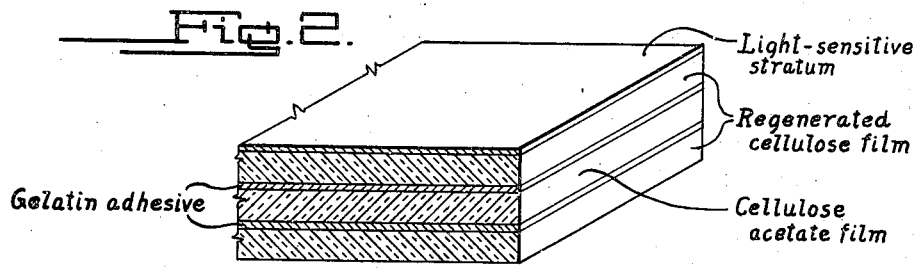
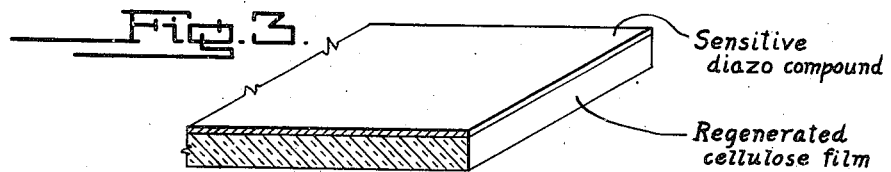
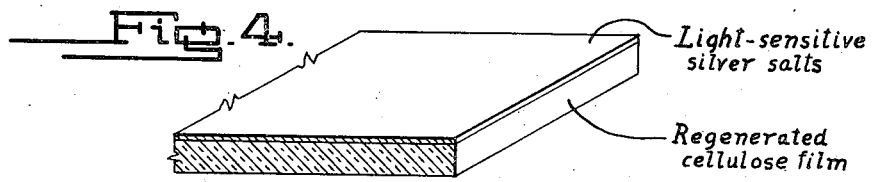
INVENTOR.
Jacques Edwin Brandenberger
BY
ATTORNEY Patented Mar. 10, 1942

2,276,151

UNITED STATES PATENT OFFICE 2,276,151

PHOTOGRAPHIC ELEMENT HAVING A LAMINATED FILM SUPPORT

Jacques Edwin Brandenberger, Paris, France, assignor to E. I. du Pont de Nemours & Company, Wilmington, Del., a corporation of Delaware Application July 5, 1939, Serial No. 282,944
In France July 9, 1938

8 Claims. (Cl. 95—9)

This invention relates to transparent cellulosic sheet material, and more particularly to laminated photograph and like film.

The photographic and cinematographic industries use films composed of a transparent material. These films serve as supports for images, sound recording, and the like.

Up to the present time the transparent sheet material has nearly always been a cellulose derivative such as nitrocellulose or cellulose acetate, although cellulose regenerated from its solutions has been tried for this purpose. All of these various supports have disadvantages which are due to the properties of the various materials which constitute them.

Nitrocellulose films, or more correctly Celluloid, i. e., films of a mixture of nitrocellulose and camphor, are very strong and not very sensitive to atmospheric variations, but they are very inflammable. Consequently it is dangerous to use them in projectors. As is well known, projectors nearly always use powerful sources of light.

The cellulose acetate film containing a plasticizer are non-inflammable, but their physical properties are inferior to those of Celluloid. They can not be passed through projectors nearly as often as Celluloid film.

The regenerated cellulose films are non-inflammable in the projectors, and they have physical properties equal to and often even superior to Celluloid, but they are relatively sensitive to water and the common commercial variety shrinks frequently in an anisotropic manner, with age. A common type of irreversible deformation known in the art as "permanent shrinkage" is described in detail in United States Patent No. 2,115,132.

The ideal film should be strong, non-inflammable and little sensitive to water at the same time, and such a product has long been a desideratum. The production of a material having these properties was the principal object of this invention. A general advance in the art, and other objects which will appear hereinafter, are also contemplated.

It has now been found that such a product can be made, and it is precisely such an entity that the invention described below covers.

Generally, and in principle, the new film or support is formed by the combination or lamination of cellulose acetate and regenerated cellulose films. The preferred form is prepared by inserting a cellulose acetate film between two regenerated cellulose films and adhering or cementing them together. These films may be assembled by suitable means and products. The adhesive properties of gelatin make it especially suitable for cementing the laminae.

Gelatin adheres filmly to regenerated cellulose, no matter what solvent is used, and does not require any special preparation of the support. On the other hand, it does not stick well to cellulose nitrate (United States Patent No. 2,085,197), and in order to make it adhere to a cellulose ester film, it is necessary to modify the surface of the film or to make use of a suitably selected substratum. This particular problem is one which must be solved when an emulsion of gelatin and silver bromide (the light sensitive material of photographic film) is applied on a Celluloid or cellulose acetate film.

An excellent film support in conformance with the invention can be made, for example, by inserting a cellulose acetate film of 0.05 mm. thickness between two regenerated cellulose films 0.04 mm. thick. The cellulose acetate and regenerated cellulose films can be combined by a substratum on the two sides of the film of cellulose acetate.

The laminae may also be united with gelatin. This may be accomplished by saponifying the two sides of the film of cellulose acetate by a treatment with a caustic soda solution followed by an acid wash which eliminates the residual alkali of the film. Surface saponification of cellulose acetate is a well known operation (see United States Patent No. 1,984,416 and British Patent No. 435,987). After the saponification operation, the acetate film can easily be made to adhere to the regenerated cellulose films by using a gelatin base glue or adhesive of which an extremely thin layer is inserted between the films to be united. After drying, it will be found that the adherence is perfect both in the dry and in the wet state. The gelatin layer serves only as a binding agent, and it can be reduced in thickness without inconvenience to one or more microns.

It is possible to glue the regenerated cellulose films in the dry or the wet state, as desired.

The resulting assemblage of three films, i. e. a cellulose acetate film between two regenerated cellulose films, is very strong mechanically due to the presence of the latter films, and it is not very sensitive to the action of water for the cellulose acetate, practically impermeable to water, opposes variations in dimensions of films of regenerated cellulose; furthermore, it is non-inflammable, like its components.

The new composite film thus obtained can be rendered sensitive to light by any known means and products. For example, a gelatin-silver bromide emulsion can be deposited on one side. There can also be produced in the mass itself of one of the regenerated cellulose films a developable silver salt such as silver bromide, for example by impregnating this film with a silver nitrate solution and then treating it with a solution of an alkaline bromide. One side can also be treated with a solution of a sensitizing bath such as a stable mixture of a light sensitive diazo compound and a phenol capable of combining with the diazo compound under the action of a liquid or gaseous alkali.

Furthermore, one of the regenerated cellulose films can be sensitized throughout or in the vicinity of one side before it is glued in the wet or dry state to the saponified acetate film.

With this composite film, it is also possible to produce a color film by dichroism, by sensitizing each of the two regenerated cellulose films with products giving complementary color images, e. g. one for rose red and the other for green.

It would be possible to replace the cellulose acetate by a nitrocellulose or Celluloid film denitrated on the surface before gluing by a saponifying action or the reducing action of a hydrosulfide bath, but such a film would, of course, have a certain inflammability.

A new film support composed of a dry regenerated cellulose film previously sensitized with a diazo compound and a phenol, inserted between two cellulose acetate films, glued, for example, with a gelation solution in acetic acid, is also within the scope of this invention. The two cellulose acetate films should be saponified only on the side in contact with the regenerated cellulose film.

Another method of carrying out the invention consists in combining a cellulose acetate film with a single regenerated cellulose film, the acetate film being saponified only on the side which comes in contact with the regenerated cellulose. The film support thus obtained, when made from regenerated cellulose film exhibiting permanent shrinkage, has a tendency, due to its asymmetric structure, to curve inward under the action of variations in moisture.

Finally, without exceeding the scope of the invention, the cinematographic film could be composed of a cellulose acetate film covered on one side with a sensitive film with a gelatin base, such as gelatin-silver bromide, and on the other side with a film of regenerated cellulose.

Regenerated cellulose film having substantially no permanent shrinkage is preferred. The preparation of such a material is described in United States Patent No. 2,115,132 (Alles and Edwards). In the interest of brevity the manner of preparation is not repeated here.

For the cellulose ester film, acetone soluble cellulose acetate or cellulose acetate-propionate are especially suitable. An acetate-propionate of 1.73 mols acetyl and 0.98 mol propionyl per glucose unit (25.7% acetyl and 19.3% propionyl or 36.0% combined acetic acid and 25.0% combined propionic acid) is especially suitable. The cellulose acetate used usually runs about 56% combined acetic acid.

Fig. 1 is a schematic perspective view of the novel film elements in a spaced assembled relationship;

Fig. 2 is a perspective view of an assembled film element;

Fig. 3 is a perspective view of an outer regenerated cellulose film element containing a stratum composed of a sensitive diazo compound;

Fig. 4 is a perspective view of an outer regenerated cellulose film element containing a stratum composed of light sensitive silver salts.

The application to photography and cinematography of a composite structure, serving as a support for light sensitive materials, composed of a combination of regenerated cellulose films and cellulose ester films, is an important if not essential characteristic of the invention.

In résumé, the invention provides:
1. A film support for photographic, cinematographic or other uses, composed of a combination of regenerated cellulose and cellulose ester films, particularly cellulose acetate.
2. The film support is composed of a cellulose acetate film covered on both sides with a regenerated cellulose film, combined by means of a gelatin solution after surface saponification of the cellulose acetate on both sides.
3. In the light sensitive support constituted as in paragraph numbered 2, one of the regenerated cellulose films is sensitive throughout or only through a part of its thickness.

As many apparently widely different embodiments of this invention may be made without departing from the spirit and scope thereof, it is to be understood that this invention is not limited to the specific embodiments thereof except as defined in the appended claims.

The following is claimed:
1. The product of claim 6 when the cellulose ester is a 1.73 mol acetate 0.98 mol propionate cellulose acetate-propionate.
2. The product of claim 6 when the cellulose ester is a 56% combined acetic acid cellulose acetate.
3. In the light sensitive support constituted as in claim 5, one of the regenerated cellulose films is sensitive at least throughout a part of its thickness.
4. A transparent laminated cellulosic sheet consisting of an intermediate layer of cellulose acetate containing about 56% combined acetic acid and outside layers of regenerated cellulose free from permanent shrinkage, the laminae being cemented together with a gelatin binding agent 1 to 2 microns thick, the cellulose acetate film being 0.05 mm. and the regenerated cellulose film being 0.04 mm. thick, and the sides of the cellulose acetate film being saponified sufficiently to adhesively accept the gelatin.
5. A photographic film element comprising a transparent laminated film support composed of a sheet of cellulose acetate having each surface saponified and united to a sheet of regenerated cellulose with a gelatin base adhesive.
6. A photographic film element comprising a transparent laminated film support composed of a sheet of cellulose acetate having each surface saponified and united to a sheet of regenerated cellulose, at least one of the last mentioned sheets containing a stratum of light sensitive material.
7. A photographic film element comprising a transparent laminated film support composed of a sheet of cellulose acetate having each surface saponified and united to a sheet of regenerated cellulose, at least one of the last-mentioned sheets being sensitized with a diazo compound and a phenol.
8. A photographic film element comprising a transparent laminated film support composed of a sheet of cellulose acetate having each surface saponified and united to a sheet of regenerated cellulose, at least one of the last-mentioned sheets bearing an emulsion layer containing a developable silver salt.

JACQUES EDWIN BRANDENBERGER.

CERTIFICATE OF CORRECTION.

Patent No. 2,276,151.                              March 10, 1942.

JACQUES EDWIN BRANDENBERGER.

It is hereby certified that error appears in the printed specification of the above numbered patent requiring correction as follows: Page 1, first column, line 59, for "filmly" read --firmly--; page 2, first column, line 23, for "gelation" read --gelatin--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.